US010726165B2

(12) United States Patent
Desai et al.

(10) Patent No.: US 10,726,165 B2
(45) **Date of Patent: *Jul. 28, 2020**

(54) TECHNOLOGIES FOR SECURE ENUMERATION OF USB DEVICES

(71) Applicant: Intel Corporation, Santa Clara, CA (US)

(72) Inventors: Soham Jayesh Desai, Atlanta, GA (US); Reshma Lal, Hillsboro, OR (US); Pradeep Pappachan, Hillsboro, OR (US); Bin Xing, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/417,907

(22) Filed: May 21, 2019

(65) Prior Publication Data

US 2019/0272394 A1 Sep. 5, 2019

Related U.S. Application Data

(63) Continuation of application No. 15/868,634, filed on Jan. 11, 2018, now Pat. No. 10,296,766.

(51) Int. Cl.
*G06F 11/30* (2006.01)
*G06F 21/85* (2013.01)
(Continued)

(52) U.S. Cl.
CPC ............ *G06F 21/85* (2013.01); *G06F 13/385* (2013.01); *G06F 13/4282* (2013.01);
(Continued)

(58) Field of Classification Search
CPC .......... G06F 21/85; G06F 21/44; G06F 21/72; G06F 13/385; G06F 13/4282; G06F 2221/2149; G06F 2213/0042
(Continued)

(56) References Cited

U.S. PATENT DOCUMENTS 7,761,618 B2 * 7/2010 Avraham ................ G06F 21/55 710/36
8,973,019 B1 * 3/2015 Lunev ................ G06F 9/45545 719/327
(Continued)

FOREIGN PATENT DOCUMENTS

EP 3179398 A1 6/2017

*Primary Examiner* — Samson B Lemma
(74) *Attorney, Agent, or Firm* — Jaffery Watson Mendonsa & Hamilton LLP

(57) ABSTRACT

Technologies for secure enumeration of USB devices include a computing device having a USB controller and a trusted execution environment (TEE). The TEE may be a secure enclave protected secure enclave support of the processor. In response to a USB device connecting to the USB controller, the TEE sends a secure command to the USB controller to protect a device descriptor for the USB device. The secure command may be sent over a secure channel to a static USB device. A driver sends a get device descriptor request to the USB device, and the USB device responds with the device descriptor. The USB controller redirects the device descriptor to a secure memory buffer, which may be located in a trusted I/O processor reserved memory region. The TEE retrieves and validates the device descriptor. If validated, the TEE may enable the USB device for use. Other embodiments are described and claimed.

20 Claims, 8 Drawing Sheets

(51) Int. Cl.
*G06F 13/38* (2006.01)
*G06F 13/42* (2006.01)
*G06F 21/44* (2013.01)
*G06F 21/72* (2013.01)
*G06F 21/57* (2013.01)
*G06F 21/53* (2013.01)

(52) U.S. Cl.
CPC .............. *G06F 21/44* (2013.01); *G06F 21/53* (2013.01); *G06F 21/57* (2013.01); *G06F 21/72* (2013.01); *G06F 2213/0042* (2013.01); *G06F 2221/2149* (2013.01)

(58) Field of Classification Search
USPC .................................................. 713/190, 193
See application file for complete search history.

(56) References Cited

U.S. PATENT DOCUMENTS

2006/0218320 A1* 9/2006 Avraham ................ G06F 21/55 710/62
2006/0218409 A1* 9/2006 Avraham .............. G06F 13/102 713/189
2008/0140811 A1* 6/2008 Welch ................. H04L 12/4625 709/219
2016/0283425 A1* 9/2016 Sarangdhar ........... G06F 13/362
2018/0293376 A1* 10/2018 El Abed .................. G06F 21/73

* cited by examiner

TECHNOLOGIES FOR SECURE ENUMERATION OF USB DEVICES

CROSS-REFERENCE TO RELATED APPLICATION

The present application is a continuation application of U.S. application Ser. No. 15/868,634, entitled "TECHNOLOGIES FOR SECURE ENUMERATION OF USB DEVICES," which was filed on Jan. 11, 2018, and which issued as U.S. Pat. No. 10,296,766 on May 21, 2019.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE. Certain devices may provide trusted I/O using an inline Channel ID filter in the SoC and a processor-based Crypto Engine (e.g., using microcode or other processor resources).

Many current computing devices include universal serial bus (USB) support, which allows peripheral devices to be connected to and disconnected from the computing device during operation (hotplugged). Typically, an operating system detects hotplug events, enumerates the connected devices, and loads corresponding device drivers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
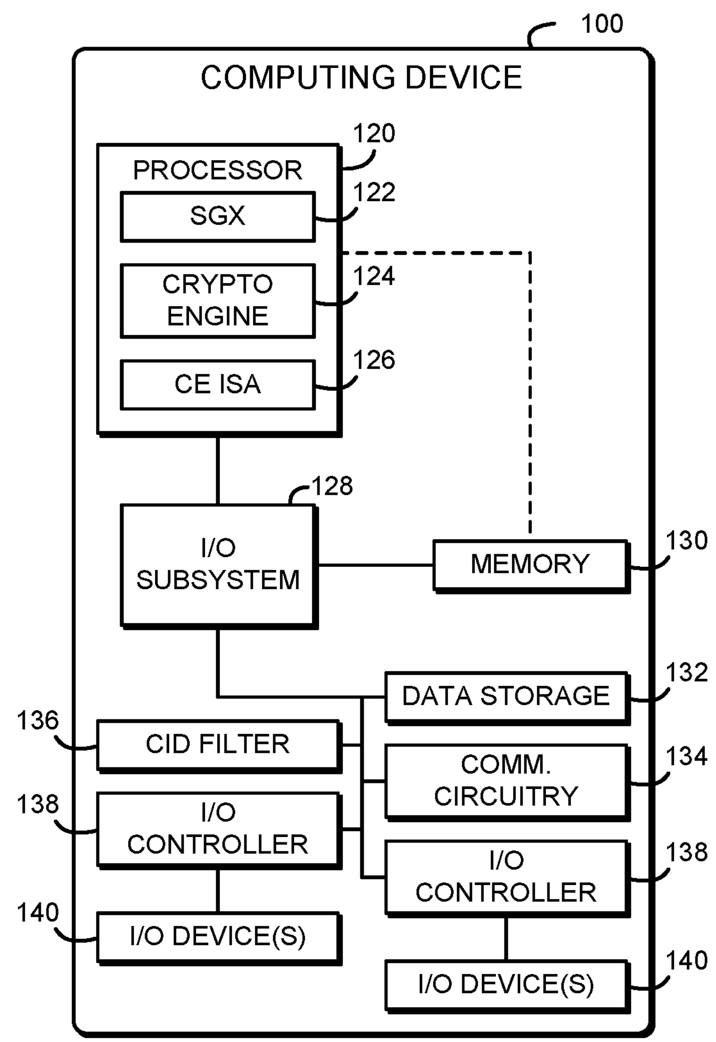
FIG. 1 is a simplified block diagram of at least one embodiment of a computing device for secure enumeration of USB devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure enumeration of USB devices is shown. The illustrative computing device 100 includes a USB controller and trusted software executing in a trusted execution environment of the computing device 100, such as a secure enclave. In use, as described further below, when a USB device is connected to the USB controller, the trusted software sends a secure command to the USB controller to protect device information for that USB device. The I/O stack of the computing device requests the USB device to provide device descriptor data, and in response to that request, the USB controller redirects the device descriptor to a secure memory buffer. The secure memory buffer may be located in a protection region of memory, such as a trusted I/O (TIO) processor reserved memory (PRM) region. The trusted software verifies the device descriptor and, if verified, may enable the USB device for use (e.g., by loading appropriate device drivers). Thus, the computing device 100 may allow trusted software to securely enumerate and use hot-plugged USB devices. Additionally, the computing device 100 allows the trusted software to verify the device descriptor without including the operating system, virtual machine monitor, or other system software in the trusted code base (TCB) of the trusted software. Thus, the computing device 100 may allow for the secure use of hot-plugged USB devices even for systems in which the operating system is untrusted. Additionally, as described further below, the computing device 100 may perform incremental enumeration of only those devices that have not previously been enumerated, which may improve enumeration performance.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, a data storage device 132, a channel identifier (CID) filter 136, and one or more I/O controllers 138. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 140. In particular, as described further below, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 136, described further below. For example, the cryptographic engine ISA 126 may include a processor instruction to bind programming instructions or other data to the cryptographic engine 124, the CID filter 136, an I/O controller 138, and/or other components of the computing device 100, a processor instruction to unwrap the bound programming instructions and provide them to the target component over a sideband network or other secure fabric of the computing device 100, a processor instruction to securely copy and encrypt data from the TIO PRM region to an unprotected memory buffer, and/or other processor features.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As described further below, the memory 130 may also include the TIO PRM region. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. The I/O subsystem 128 may further include a sideband network, secure fabric, or other secure routing support. The secure routing support may include hardware support to ensure I/O data cannot be misrouted in the I/O subsystem 128 under the influence of rogue software. The secure routing support may be used with the CID filter 136 to provide cryptographic protection of I/O data. Additionally, in some embodiments, the I/O subsystem 128 may form a portion of a system-on-a-chip (SoC) and be incorporated, along with the processor 120, the memory 130, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 136 may be embodied as any hardware component, functional block, logic, or other circuit that performs channel identifier (CID) filtering function(s), including filtering I/O transactions based on CIDs inserted by the I/O controllers 138. For example, the CID filter 136 may observe DMA transactions inline, perform test(s) based on the CID and memory address included in the transaction, and drop transactions that fail the test(s). In the illustrative embodiment, the CID filter 136 is included in an SoC with the processor 120 and I/O subsystem 128. In other embodiments, the CID filter 136 may be incorporated in one or more components such as the I/O subsystem 128.

Figure 2:
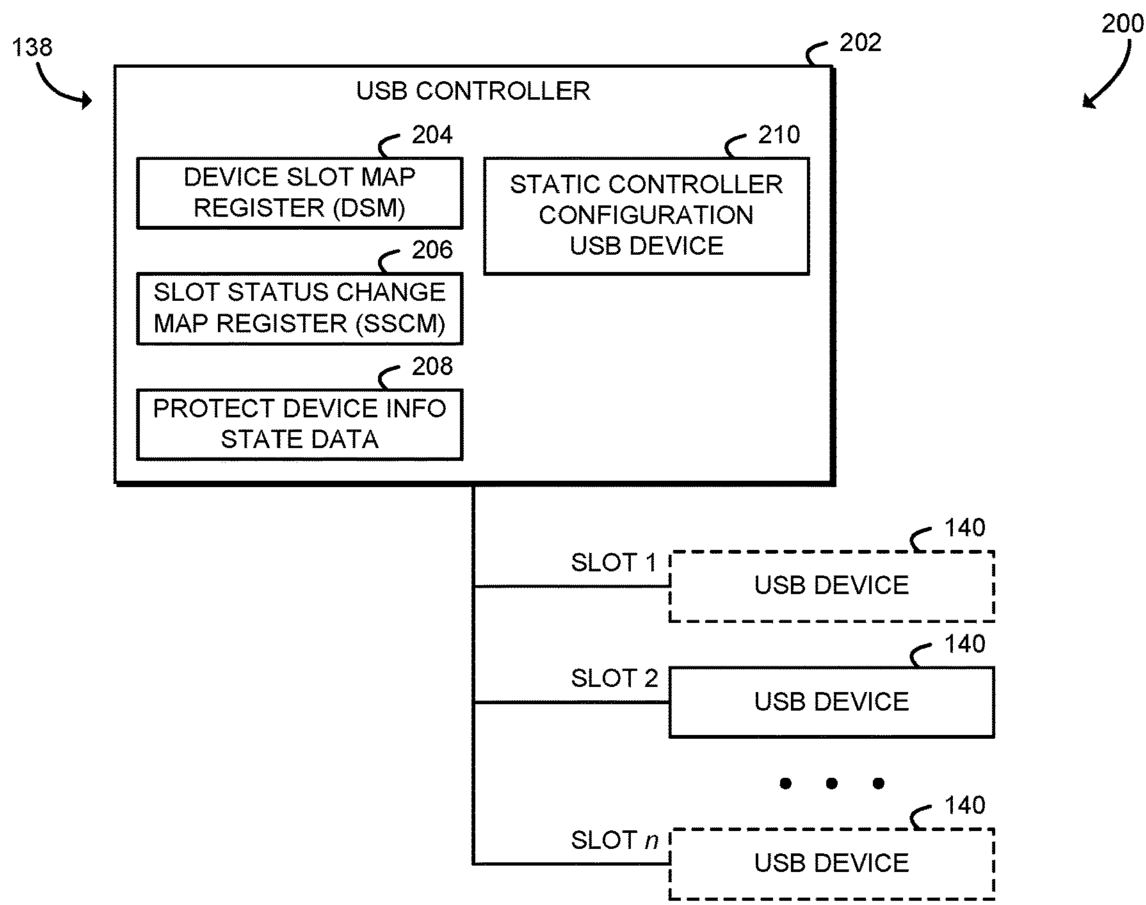
FIG. 2 is a simplified block diagram of at least one embodiment of a USB controller and connected USB peripheral devices.

Each of the I/O controllers 138 may be embodied as any USB controller, embedded controller, microcontroller, microprocessor, functional block, logic, or other circuit or collection of circuits capable of performing the functions described herein. For example, the I/O controllers 138 may include one more USB controllers as shown in FIG. 2 and as discussed below. In some embodiments, one or more of the I/O controllers 138 may be embedded in another component of the computing device 100 such as the I/O subsystem 128 and/or the processor 120. Additionally or alternatively, one or more of the I/O controllers 138 may be connected to the I/O subsystem 128 and/or the processor 120 via an expansion bus such as PCI Express (PCIe) or other I/O connection. As described above, the I/O controllers 138 communicate with one or more I/O devices 140, for example over a peripheral communications bus (e.g., USB, Bluetooth, etc.). The I/O devices 140 may be embodied as any I/O device, such as human interface devices, keyboards, mice, touch screens, microphones, cameras, and other input devices, as well as displays and other output devices. The I/O controllers 138 and associated DMA channels may be uniquely identified using identifiers called channel identifiers (CIDs). Each I/O controller 138 may assert an appropriate CID with every trusted I/O DMA transaction, for example as part of a transaction layer packet (TLP) prefix, to uniquely identify the source of the DMA transaction and provide liveness protections. The CID also enables the isolation of I/O from different devices 140.

Referring now to FIG. 2, a diagram 200 shows an illustrative USB controller 202. The USB controller 202 may be embodied as an I/O controller 138, and thus may be connected to multiple USB devices 140. The USB controller 202 supports a maximum number n of device slots. Each device slot represents a port, index, or other location at which a USB device 140 may attach to the USB controller 202. The USB devices 140 may be hotplugged to the computing device 100, meaning that each device slot may be connected and/or disconnected from a USB device 140 at runtime.

As shown, the illustrative USB controller 202 includes a device slot map (DSM) register 204, a slot status change map (SSCM) register 206, a protect device info state data 208, and a static controller configuration USB device 210. The DSM register 204 indicates which device slots currently are attached to USB devices 140. For example, the DSM register 204 may be embodied as a bitmap with each bit corresponding to a device slot. If a bit in the DSM register 204 is set, this indicates that a USB device 140 is connected to that corresponding device slot. Similarly, the SSCM register 206 indicates which device slots have had a hotplug connect or disconnect event. Initially, the SSCM register 206 may be the same as the DSM register 204. As described further below, trusted software may reset the SSCM register 206 after successful device enumeration.

As described further below, the protect device info state data 208 may be used by the USB controller 202 to identify requests for device descriptor data that should be protected. The protect device info state data 208 may include, for example, a request type (e.g., get device descriptor), a slot identifier, a secure buffer address, and in some embodiments, a nonce for replay protection.

The static controller configuration USB device 210 may be embodied as a USB device 140 that is statically connected to the USB controller 202. In some embodiments, the static controller configuration USB device 210 may be included in or otherwise incorporated in the USB controller 202. As described further below, in some embodiments, trusted software may establish a TIO secure channel to the static controller configuration USB device 210 in order to securely send commands to the USB controller 202.

Figure 3:
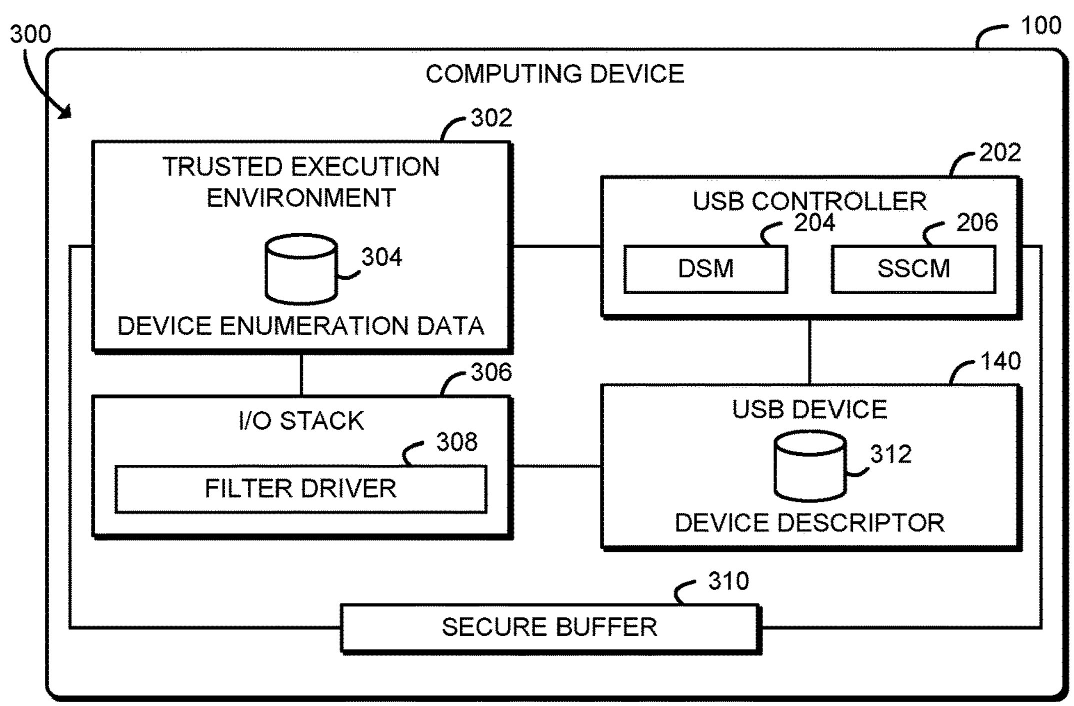
FIG. 3 is a simplified block diagram of at least one embodiment of an environment of the computing device of FIG. 1.

Referring now to FIG. 3, in an illustrative embodiment, the computing device 100 establishes an environment 300 during operation. The illustrative environment 300 includes a trusted execution environment 302, an I/O stack 306, a secure buffer 310, and the USB controller 202. The various components of the environment 300 may be embodied as hardware, firmware, software, or a combination thereof. As such, in some embodiments, one or more of the components of the environment 300 may be embodied as circuitry or collection of electrical devices (e.g., trusted execution environment circuitry 302, I/O stack 306 circuitry, secure buffer circuitry 310, and/or USB controller circuitry 202). It should be appreciated that, in such embodiments, one or more of the trusted execution environment circuitry 302, the I/O stack 306 circuitry, and/or the secure buffer circuitry 310 may form a portion of the processor 120, the I/O subsystem 128, the USB controller 202, and/or other components of the computing device 100. Additionally, in some embodiments, one or more of the illustrative components may form a portion of another component and/or one or more of the illustrative components may be independent of one another.

The trusted execution environment 302 may be embodied as trusted software of the computing device 100, such as a secure enclave established with the secure enclave support 122 of the processor 120. The trusted execution environment 302 may send secure commands to the USB controller 202 that are protected from untrusted software of the computing device 100 such as an operating system. In some embodiments, the trusted execution environment 302 may send the secure commands to the static controller configuration USB device 210 over a secure I/O channel. In some embodiments, the trusted execution environment 302 may execute an EBIND processor instruction to bind the secure command to the USB controller 202 and then execute (or request an operating system to execute) an UNWRAP instruction to unwrap the secure command and deliver the secure command to the USB controller over a secure fabric of the computing device 100.

The trusted execution environment 302 is configured to determine whether a USB device 140 has been connected to the USB controller 202. To do so, the trusted execution environment 302 may send a secure command to the USB controller 202 to get the values of the DSM register 204 and the SSCM register 206. If a USB device 140 has been connected, the trusted execution environment 302 may send a secure command to the USB controller 202 to lock a USB configuration state and then enumerate the connected USB device 140.

The trusted execution environment 302 is configured to send a secure command to the USB controller 202 to protect a device descriptor request for each USB device 140 that has been connected to the USB controller 202. The trusted execution environment 302 is further configured to verify a device descriptor 312 from the USB device 140 and, if verified, to enable the USB device 140. The trusted execution environment 302 may record data for successfully enumerated USB devices 140 in device enumeration data 304. If a USB device 140 is disconnected, the trusted execution environment 302 may disable the peripheral device or otherwise update the device enumeration data 304. If the device descriptor 312 is successfully verified, the trusted execution environment 302 may send a secure command to the USB controller 202 to get the DSM register 204 and the SSCM register 206 values with a reset bit set, which causes the USB controller 202 to clear the SSCM register 206. If the device descriptor 312 is successfully verified, the trusted execution environment 302 may send a secure command to the USB controller 202 to unlock the USB configuration state.

The I/O stack 306 may be embodied as an operating system I/O stack and may include one or more class drivers, device drivers, or other components used to perform I/O operations. As shown, the I/O stack 306 includes a filter driver 308, which may be embodied as a kernel driver capable of intercepting and/or generating I/O requests. The filter driver 308 is configured to send a device descriptor request to a USB device 140 after the secure command to protect device info has been sent by the trusted execution environment 302 to the USB controller 202. The filter driver 308 may send the device descriptor request in response to a system call issued by the trusted execution environment 302. In response to the device descriptor request, the USB device 140 provides a response including a device descriptor 312, which may be embodied as metadata describing the USB device 140.

The USB controller 202 is configured to redirect the device descriptor 312 received from the USB device 140 to the secure memory buffer 310 after receiving the secure command to protect the device data. Redirecting the device descriptor 312 may include determining whether a device descriptor request matches a request type and slot identifier of the secure command and, if so, replacing a target address of the device descriptor request with the memory address of the secure memory buffer 310. Redirecting the device descriptor 312 may further include appending the nonce to the device descriptor 312, which may be verified by the trusted execution environment 302. The secure buffer 310 may be embodied as a secure memory buffer that is not accessible by untrusted software of the computing device 100, such as the TIO PRM.

Figure 4:
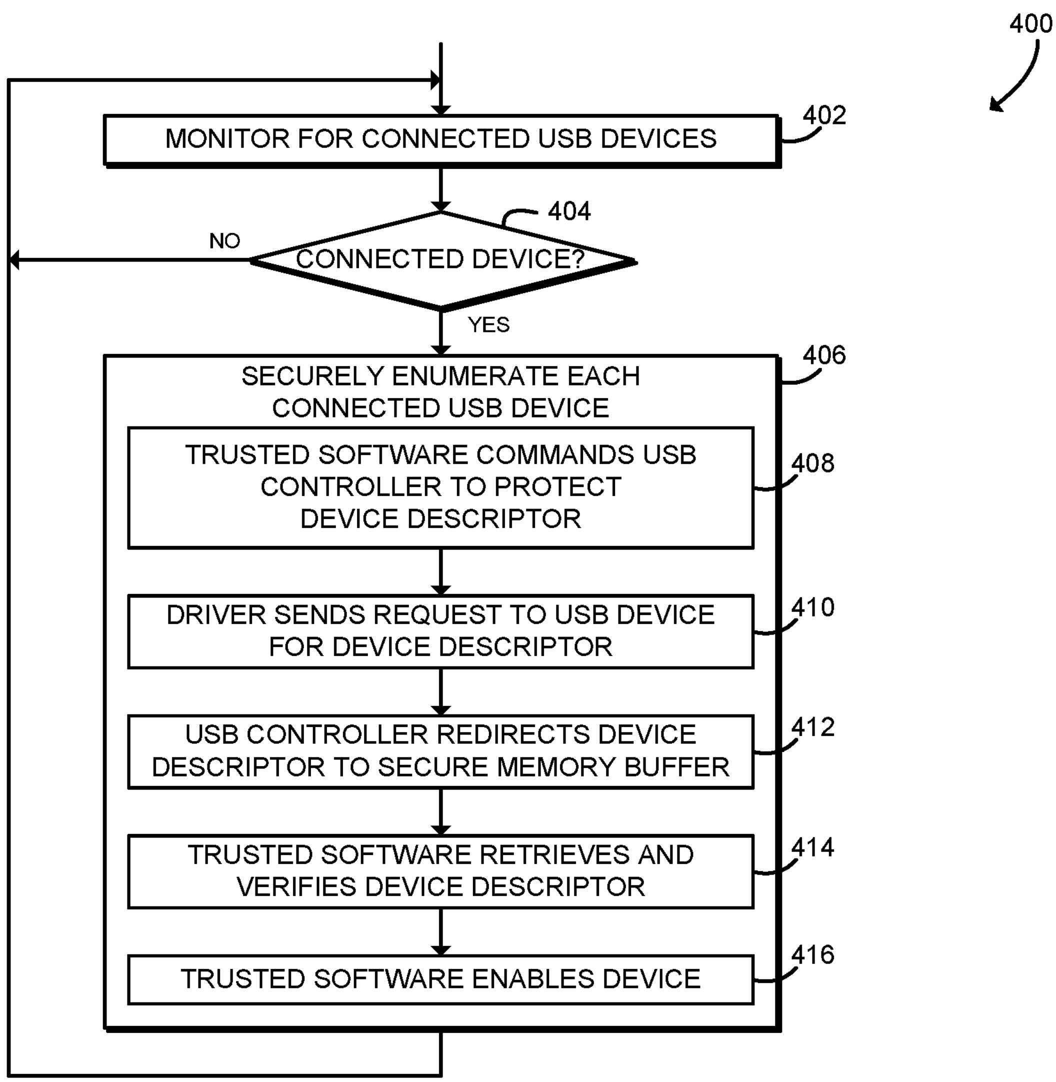
FIG. 4 is a simplified flow diagram of at least one embodiment of a method for secure enumeration of USB devices that may be executed by the computing device of FIGS. 1-3.

Referring now to FIG. 4, in use, the computing device 100 may execute a method 400 for secure enumeration of USB devices. It should be appreciated that, in some embodiments, the operations of the method 400 may be performed by one or more components of the environment 300 of the computing device 100 as shown in FIG. 3. The method 400 begins in block 402, in which the computing device 100 monitors for USB devices 140 connected to the USB controller 202. In some embodiments, the computing device 100 may perform incremental enumeration, meaning that the computing device 100 monitors for newly-connected or disconnected USB devices 140. For example, the trusted execution environment 302 may send secure commands to the USB controller 202 to poll the DSM register 204 and the SSCM register 206. One potential embodiment of a method for monitoring for USB devices 140 is described below in connection with FIG. 5. In block 404, the computing device 100 determines whether any USB device 140 has been connected. If not, the method 400 loops back to block 402 to continue monitoring for USB devices 140. If any USB devices 140 have been connected, the method 400 advances to block 406.

In block 406, the computing device 100 securely enumerates each connected USB device 140. Secure enumeration allows trusted software of the computing device 100 (e.g., the trusted execution environment 302) to securely identify the connected devices 140 and prepare them for use. To perform secure enumeration for each connected USB device 140, in block 408 trusted software commands the USB controller 202 to protect device descriptor 312 data for the connected USB device 140. In block 410, a driver in the I/O stack 306 (e.g., the filter driver 308) sends a request to the USB device 140 for the device descriptor 312. In block 412, the USB device 140 responds with the device descriptor 312, and the USB controller 202 redirects the device descriptor 312 to the secure memory buffer 310. In block 414, the trusted software retrieves and verifies the device descriptor 312. If successfully verified, in block 416, the trusted software enables the USB device 140. The trusted software may, for example, load one or more device drivers for the USB device 140, set up a TIO secure channel to communicate securely with the USB device 140, and/or perform other operations to prepare the USB device 140 for use. The trusted software may also update the device enumeration data 304 to indicate that the USB device 140 has been successfully enumerated. Potential embodiments of methods for securely enumerating a USB device 140 are described below in connection with FIGS. 6-9. After enumerating the connected USB devices 140, the method 400 loops back to block 402 to continue monitoring for connected USB devices 140.

Figure 5:
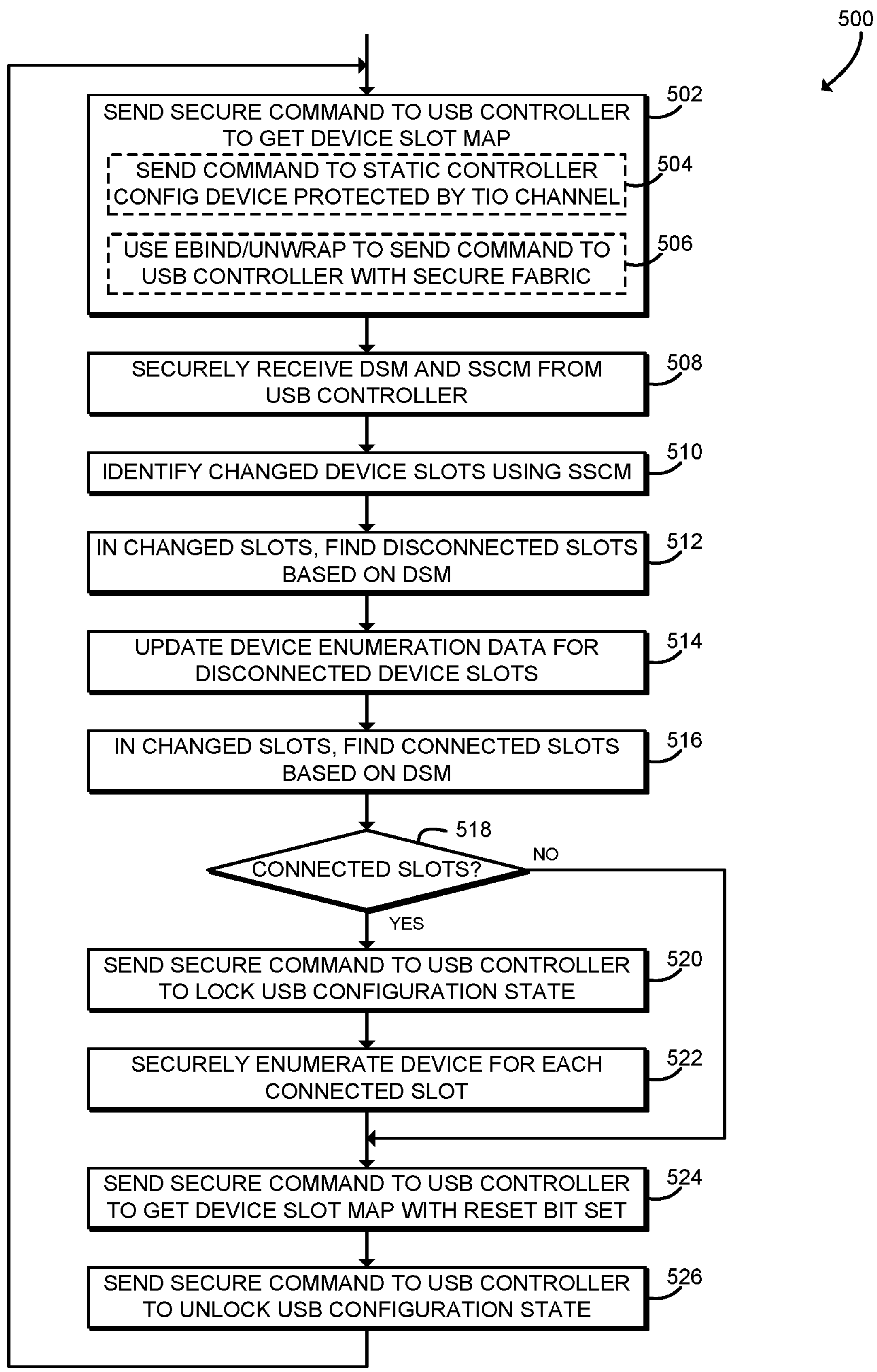
FIG. 5 is a simplified flow diagram of at least one embodiment of a method for hotplug detection and enumeration of USB devices that may be executed by a trusted execution environment of the computing device of FIGS. 1-3.

Referring now to FIG. 5, in use, the computing device 100 may execute a method 500 for hotplug detection and enumeration of USB devices. It should be appreciated that, in some embodiments, the operations of the method 500 may be performed by one or more components of the environment 300 of the computing device 100 as shown in FIG. 3, such as the trusted execution environment 302. The method 500 begins in block 502, in which the trusted execution environment 302 sends a secure command to the USB controller 202 to get a device slot map. In some embodiments, the command to get the device slot map may include a reset bit that, when set, causes the USB controller 202 to reset the SSCM register 206. The trusted execution environment 302 requests the device slot map with the reset bit cleared; in other words, the SSCM register 206 is not reset before device enumeration has been performed.

As described above, the trusted execution environment 302 may use any technique to send the secure command to the USB controller 202 that is protected from the operating system or other untrusted software of the computing device 100. In some embodiments, in block 504 the trusted execution environment 302 may send the secure command to the static controller configuration USB device 210 over a secure channel that is protected by trusted I/O. For example, the static controller configuration USB device 210 may be assigned a static channel identifier (CID), and the command may be sent as I/O data protected by that CID. The CE 124, the CID filter 136, and/or secure routing support of the I/O subsystem 128 may ensure that the contents of the secure command are not accessible by untrusted software or by other I/O controllers 138 of the computing device 100.

In some embodiments, in block 506, the trusted execution environment 302 may use the EBIND and UNWRAP processor instructions to send the command to the USB controller 202 securely over a secure fabric of the computing device 100. For example, executing the EBIND instruction may encrypt (bind) the secure command with an encryption key that is private to the processor 120, which protects the contents of the secure command from untrusted software such as the operating system. The UNWRAP instruction (which may be executed by the operating system or an operating system driver) causes microcode of the processor 120 to decrypt the command and deliver the decrypted command to the USB controller 202 over a secure fabric such as a sideband network. The sideband network may be embodied as, for example, a fabric, mesh, ring, or other collection of electrical connections that supports secure routing to components of the computing device 100 but does not support routing beyond the computing device 100 (i.e., over a network interface).

In block 508, in response to the secure command, the trusted execution environment 302 receives the values of the DSM register 204 and the SSCM register 206 from the USB controller 202. In block 510, the trusted execution environment 302 identifies changed device slots using the value of the SSCM register 206. As described above, the SSCM register 206 may be embodied as a bitmap, and each bit set in the SSCM register 206 indicates a change in status (e.g., connected or disconnected) for the device attached to that slot. Thus, by identifying the changed slots, the trusted execution environment 302 may perform incremental enumeration and avoid enumerating the same USB device 140 multiple times.

In block 512, selecting from the changed device slots, the trusted execution environment 302 finds any disconnected slots. The trusted execution environment 302 uses the value of the DSM register 204 to determine whether slots are disconnected. As described above, the DSM register 204 may be embodied as a bitmap, with each bit representing whether the corresponding slot is connected or disconnected. Thus, to identify disconnected slots, the trusted execution environment 302 may identify bits in the DSM register 204 that are cleared. In block 514, the trusted execution environment 302 updates the device enumeration data 304 for the disconnected slots. The trusted execution environment 302 may, for example, delete device enumeration data 304 for the device 140 that was previously attached to the disconnected slot or otherwise disable the disconnected device 140.

In block 516, selecting from the changed device slots, the trusted execution environment 302 finds any connected slots. Connected slots indicated that a new USB device 140 has been connected to the USB controller 202 and is attached to the corresponding slot. Similar to identified disconnected slots as described above, to identify connected slots the trusted execution environment 302 may identify bits in the DSM register 204 that are set. In block 518, the trusted execution environment 302 determines whether any of the changed slots are connected. If not, the method 500 branches ahead to block 524, described below. If one or more changed slots are connected, the method 500 advances to block 520.

In block 520, the trusted execution environment 302 sends a secure command to the USB controller 202 to lock the USB configuration state. Locking the configuration state may cause the USB controller 202 to stop forwarding any device connect or disconnect events to software. Connect and disconnect events may be queued by the USB controller 202 until the USB configuration is unlocked, after which the queued events are forwarded to software. The command may include a bit that is set to indicate whether to lock or unlock the USB configuration state. As described above, the trusted execution environment 302 may use any technique to send the secure command, such as sending the command to the static controller configuration USB device 210 or executing the EBIND and UNWRAP instructions.

In block 522, the trusted execution environment 302 securely enumerates the USB device 140 attached to each connected slot. As part of the secure enumeration, the trusted execution environment 302 retrieves and verifies a device descriptor 312 from each USB device 140. Potential embodiments of methods for secure enumeration are described below in connection with FIGS. 6-9.

After performing secure enumeration, in block 524, the trusted execution environment 302 sends a secure command to the USB controller 202 to get the device slot map data with the reset bit set. As described above in connection with block 502, setting the reset bit causes the USB controller 202 to clear the SSCM register 206. Thus, after successful enumeration the SSCM register 206 is cleared and the trusted execution environment 302 may subsequently only enumerate newly-connected devices. In block 526, the trusted execution environment 302 sends a secure command to the USB controller 202 to unlock the USB configuration state. As described above in connection with block 520, the USB controller 202 may resume sending device connect and disconnect events to software, including any queued events. After unlocking the USB configuration state, the method 500 loops back to block 502 to continue monitoring for changed device slots.

Figure 6:
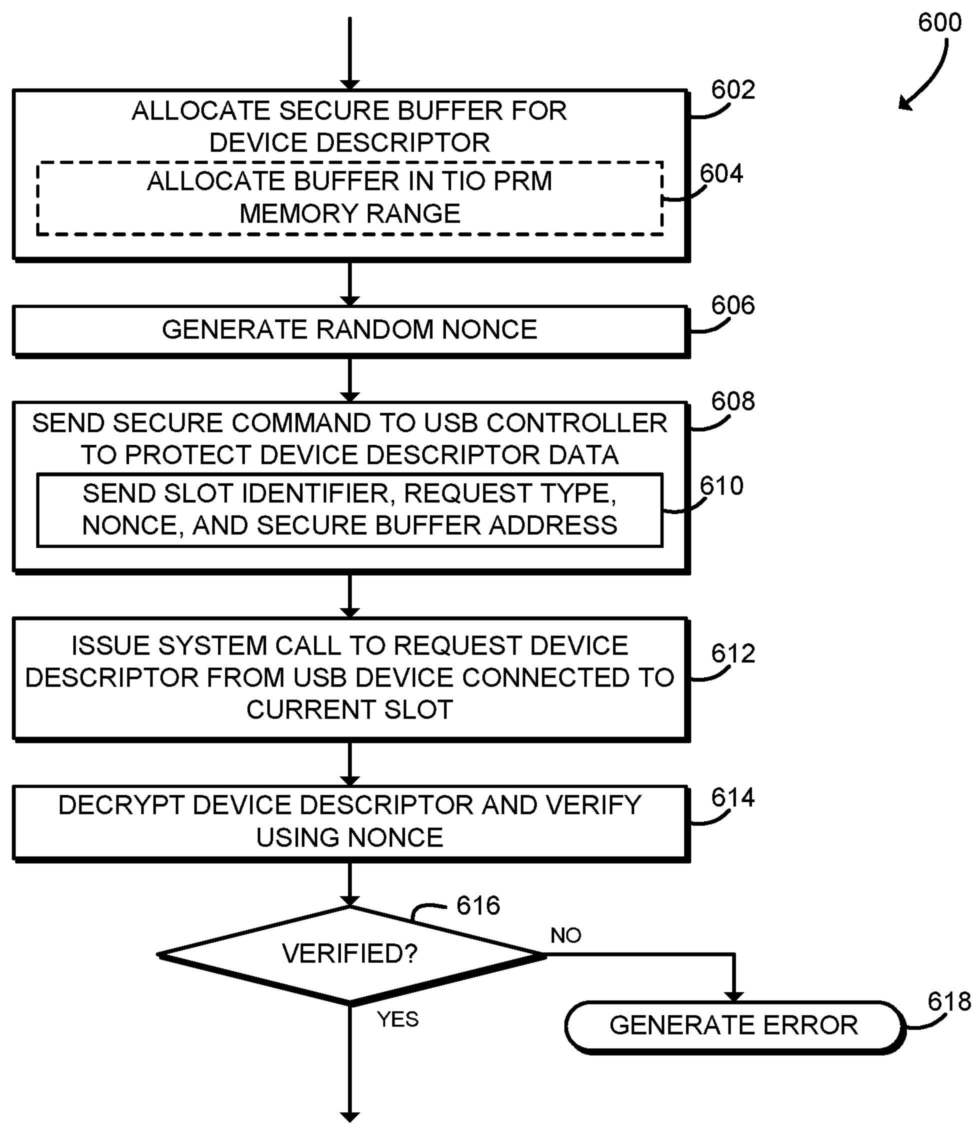
FIG. 6 is a simplified flow diagram of at least one embodiment of a method for secure enumeration of USB devices that may be executed by the trusted execution environment of the computing device of FIGS. 1-3.

Referring now to FIG. 6, in use, the computing device 100 may execute a method 600 for secure enumeration of USB devices. It should be appreciated that, in some embodiments, the operations of the method 600 may be performed by one or more components of the environment 300 of the computing device 100 as shown in FIG. 3, such as the trusted execution environment 302. The method 600 may be executed once for each connected device 140 that is securely enumerated, as described above in connection with block 522 of FIG. 5. The method 600 begins in block 602, in which the trusted execution environment 302 allocates a secure buffer 310 for the device descriptor 312. The secure buffer 310 may be any memory buffer that is not accessible to untrusted software such as an operating system of the computing device 100. In some embodiments, in block 604 the trusted execution environment 302 may allocate the secure buffer 310 in the TIO PRM memory range, which is a processor reserved memory range that is not accessible to any software executed by the computing device 100 (including the operating system). In some embodiments, the secure buffer 310 may also be associated with a range in the TIO PRM reserved for a particular CID, such as the CID reserved for the static controller configuration USB device 210 and/or the connected USB device 140.

In block 606, the trusted execution environment 302 generates a random nonce. As described further below, the nonce may be used for replay protection when verifying the device descriptor 312. In some embodiments, the device descriptor 312 may be transmitted securely without the need for replay protection; in those embodiments, the trusted execution environment 302 may not generate a nonce.

In block 608, the trusted execution environment 302 sends a secure command to the USB controller 202 to protect device descriptor 312 data from the connected USB device 140. In block 610, the trusted execution environment 302 sends a slot identifier associated with the USB device 140, a request type (illustratively, a get device descriptor request), the nonce, and a memory address of the secure buffer 310. That data may be sent, for example, as fields of the secure command. As described above, the trusted execution environment 302 may use any technique to send the secure command, such as sending the command to the static controller configuration USB device 210 or executing the EBIND and UNWRAP instructions.

In block 612, the trusted execution environment 302 issues a system call such as an IOCTL to request the device descriptor 312 from the USB device 140 connected to the current device slot being enumerated. The system call may be handled by the filter driver 308, which may issue the request to the USB device 140. One potential embodiment of a method for processing the system call is described below in connection with FIG. 7. In response to the request, the USB device 140 responds with the device descriptor 312 and the USB controller 202 redirects the device descriptor 312 to the secure memory buffer 310. One potential embodiment of a method for protecting the device descriptor 312 is described below in connection with FIGS. 8-9. After redirection, the device descriptor 312 may be encrypted and stored in a memory buffer accessible by the trusted execution environment 302.

In block 614, the trusted execution environment 302 decrypts the device descriptor 312 and verifies the device descriptor 312 using the nonce. For example, the device descriptor 312 may be integrity-protected and verified using trusted I/O facilities of the computing device 100, such as the CE 124 and/or the CID filter 136. The trusted execution environment 302 may compare a nonce included with the device descriptor 312 with the nonce generated in block 606 to detect potential replay attacks. In block 616, the trusted execution environment 302 determines whether the device descriptor 312 is verified. If not, the method 600 branches to block 618, in which the trusted execution environment 302 generates an error. If the device descriptor 312 is verified, then the device 140 was successfully enumerated and the method 600 is completed. As described above, the trusted execution environment 302 may decode the device descriptor 312, install device drivers, or otherwise use the USB device 140.

Figure 7:
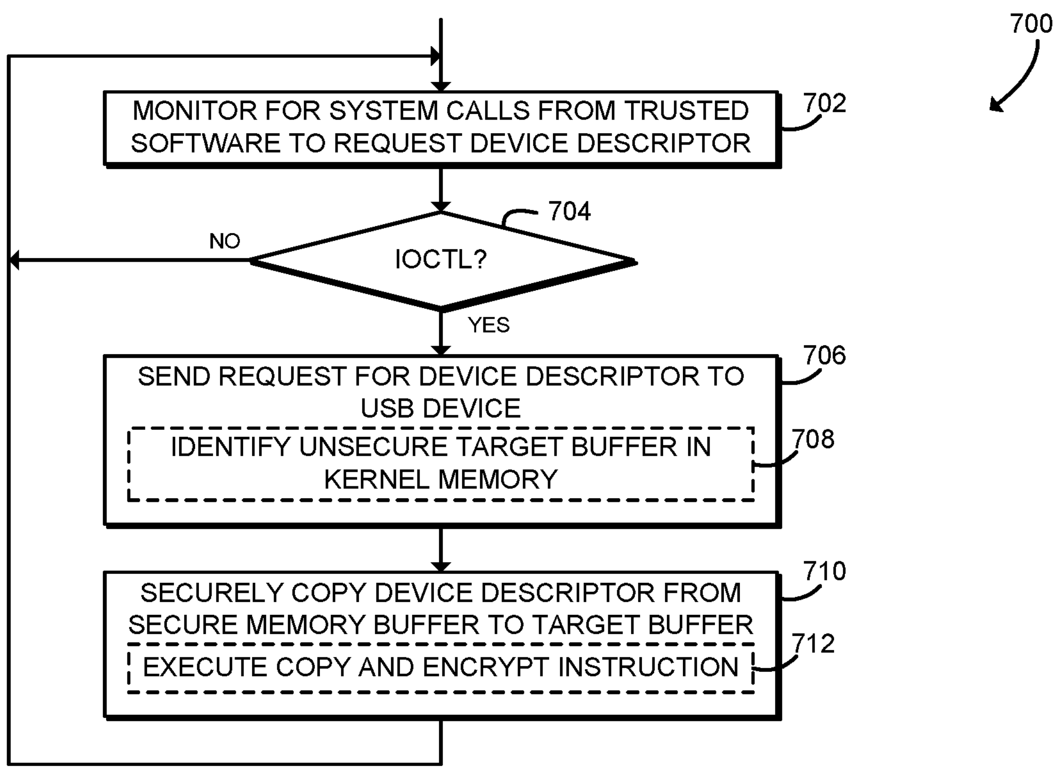
FIG. 7 is a simplified flow diagram of at least one embodiment of a method for secure enumeration of USB devices that may be executed by a filter driver of the computing device of FIGS. 1-3.

Referring now to FIG. 7, in use, the computing device 100 may execute a method 700 for secure enumeration of USB devices. It should be appreciated that, in some embodiments, the operations of the method 700 may be performed by one or more components of the environment 300 of the computing device 100 as shown in FIG. 3, such as the filter driver 308. The method 700 begins in block 702, in which the filter driver 308 monitors for system calls (e.g., IOCTLs) from trusted software to request a device descriptor 312 from a USB device 140. In block 704, the filter driver 308 determines whether an IOCTL has been issued. If not, the method 700 loops back to block 702 to continue monitoring for system calls. If an IOCTL was issued, the method 700 advances to block 706.

In block 706, the filter driver 308 sends a request for a device descriptor 312 to the USB device 140. The request for device descriptor 312 may be the same or similar as a typical unsecured request for device descriptor 312. In some embodiments, in block 708 the request may identify an unsecure target buffer in kernel memory. As described below in connection with FIGS. 8 and 9, in response to the request, the USB controller 202 redirects the device descriptor 312 to the secure memory buffer 310, which is illustratively included in the TIO PRM memory range.

In block 710, the filter driver 308 securely copies the device descriptor 312 from the secure memory buffer 310 to a target memory buffer accessible to the trusted software (e.g., a kernel buffer or a user-mode buffer accessible by the trusted execution environment 302). In some embodiments, in block 712 the filter driver 308 may execute a copy and encrypt processor instruction to cause the processor 120 to encrypt the device descriptor 312 and copy the encrypted data to the target buffer. After being copied to the target buffer, the device descriptor 312 may be validated, decoded, and otherwise processed by the trusted execution environment 302 as described above in connection with FIG. 6. Additionally or alternatively, although illustrated as being performed by the filter driver 308, it should be understood that in some embodiments different components of the computing device 100 may retrieve the device descriptor 312 from the secure memory buffer 310. For example, in some embodiments the trusted execution environment 302 may execute the copy and encrypt instruction. After copying the device descriptor 312, the method 700 loops back to block 702 to continue monitoring for system calls.

Figure 8:
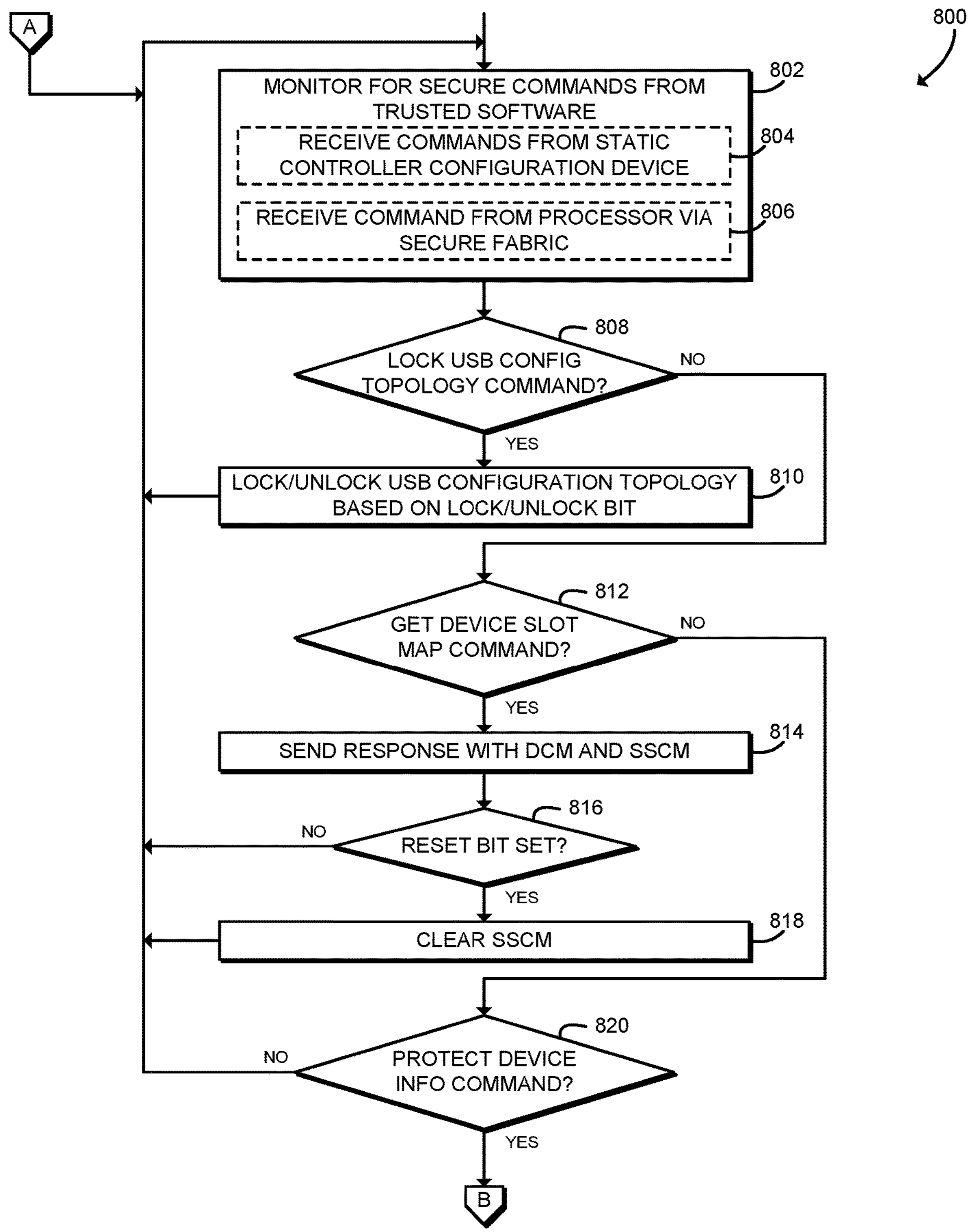
FIGS. 8 and 9 are a simplified flow diagram of at least one embodiment of a method for hotplug detection and enumeration of USB devices that may be executed by the USB controller of the computing device of FIGS. 1-3.
Figure 9:
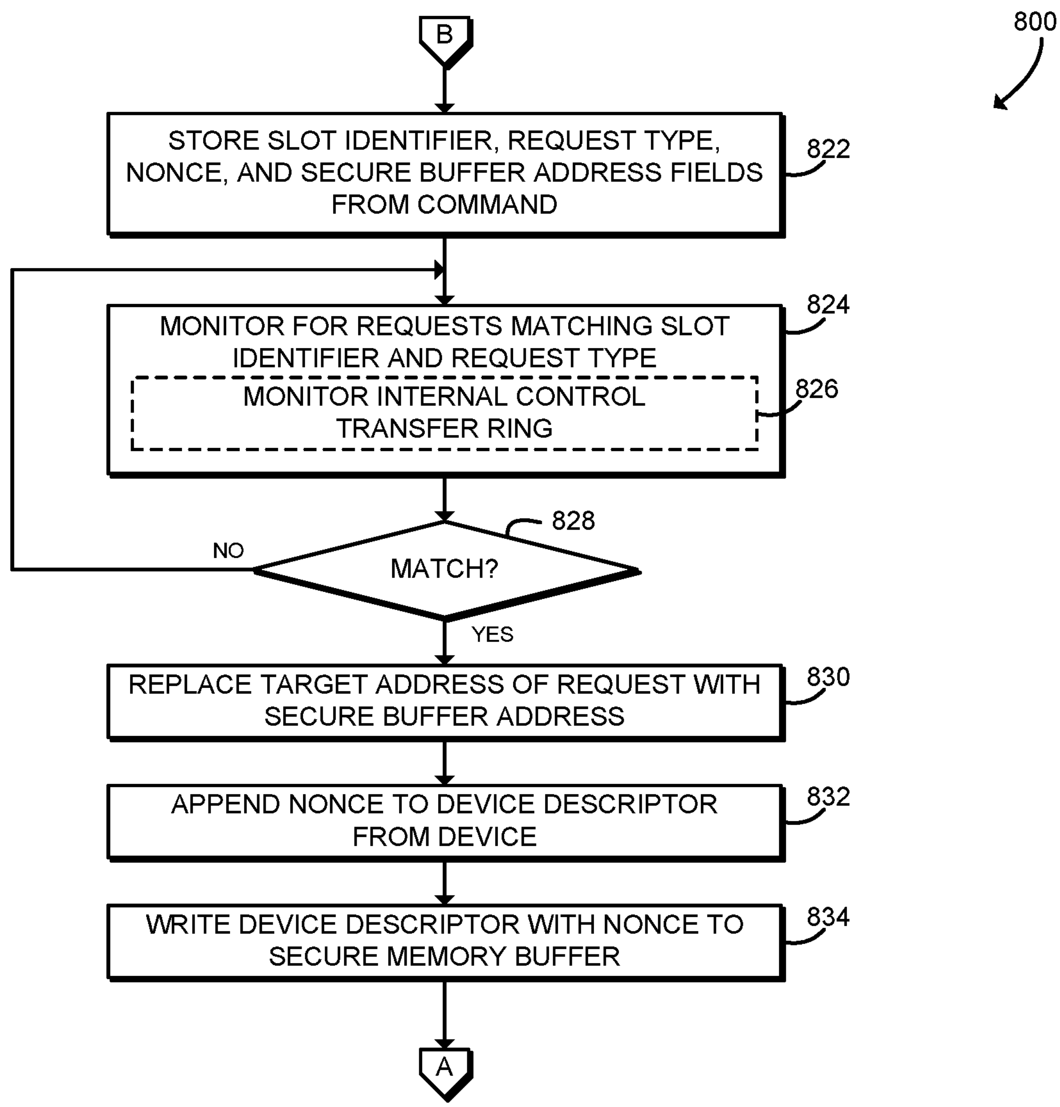

Referring now to FIGS. 8 and 9, in use, the computing device 100 may execute a method 800 for hotplug detection and enumeration of USB devices. It should be appreciated that, in some embodiments, the operations of the method 800 may be performed by one or more components of the environment 300 of the computing device 100 as shown in FIG. 3, such as the USB controller 202. The method 800 begins in block 802, in which the USB controller 202 monitors for secure commands from trusted software such as the trusted execution environment 302. As described above, the trusted execution environment 302 may use any technique to send the secure command to the USB controller 202 that is protected from the operating system or other untrusted software of the computing device 100. In some embodiments, in block 804 the USB controller 202 may receive secure commands sent to the static controller configuration USB device 210. As described above, those commands may be sent over a secure channel that is protected by trusted I/O. In some embodiments, in block 806, the trusted execution environment 302 may receive commands from the processor 120 over a secure fabric such as the sideband network of the computing device 100. For example, as described above, in response to an UNWRAP instruction the processor 120 may decrypt a command and deliver the decrypted command to the USB controller 202 over the secure fabric.

In block 808, the USB controller 202 determines whether a lock USB configuration topology command has been received. If not, the method 800 branches ahead to block 812, described below. If a lock USB configuration topology command has been received, the method 800 advances to block 810, in which the USB controller locks or unlocks the USB configuration topology based on the value of a lock/unlock bit included in the command. As described above, locking the configuration state may cause the USB controller 202 to stop forwarding any device connect or disconnect events to software. Connect and disconnect events may be queued by the USB controller 202 until the USB configuration is unlocked, after which the queued events are forwarded to software. After locking or unlocking the configuration state, the method 800 loops back to block 802 to continue monitoring for secure commands.

In block 812, the USB controller 202 determines whether a get device slot map command has been received. If not, the method 800 branches ahead to block 820, described below. If a get device slot map command has been received, the method 800 advances to block 814, in which the USB controller 202 sends a response including the values of the DSM register 204 and the SSCM register 206. In block 816, the USB controller 202 determines whether a reset bit of the command is set. If not, the method 800 loops back to block 802 to continue monitoring for secure commands. If the reset bit is set, the method 800 advance to block 818, in which the USB controller 202 clears the SSCM register 206. After clearing the SSCM register 206, the method 800 loops back to block 802 to continue monitoring for secure commands.

In block 820, the USB controller 202 determines whether a protect device info command has been received. If not, the method 800 loops back to block 802 to continue monitoring for secure commands. If a protect device info command has been received, the method 800 advances to block 822, shown in FIG. 9.

In block 822, the USB controller 202 stores the slot identifier, request type, nonce, and secure buffer address fields from the secure command. Those fields may be stored in the protect device info state data 208 or other state of the USB controller 202. In block 824, the USB controller 202 monitors for requests to USB devices 140 that include a matching slot identifier and request type. As described above, the request type may be "get device descriptor." The USB controller 202 may use any technique to monitor for requests submitted to the USB devices 140. In some embodiments, in block 826 the USB controller 202 may monitor an internal control transfer ring of the USB controller 202. The control transfer ring may be embodied as a ring buffer that queues requests from software that are then sequentially issued to USB devices 140. In block 828, the USB controller 202 determines whether a matching request has been found. If not, the method 800 loops back to block 824 to continue monitoring for matching requests. If a matching request has been found, the method 800 advances to block 830.

In block 830, the USB controller 202 replaces a target address of the request with the secure buffer 310 address stored earlier as described above in connection with block 822. In block 832, the USB controller 202 appends a nonce to the device descriptor 312 received from the USB device 140. As described above, the nonce may be used for replay protection. In block 834, the USB controller 202 writes the device descriptor 312 with the nonce to the secure buffer 310. For example, the USB controller 202 may perform a DMA operation to write to the secure buffer 310 within the TIO PRM. Thus, the device descriptor 312 and nonce may be protected from untrusted software of the computing device 100. After writing the device descriptor 312, the method 800 loops back to block 802, shown in FIG. 8, to continue monitoring for secure commands.

It should be appreciated that, in some embodiments, the methods 400, 500, 600, 700 and/or 800 may be embodied as various instructions stored on a computer-readable media, which may be executed by the processor 120, the I/O subsystem 128, the USB controller 202, and/or other components of the computing device 100 to cause the computing device 100 to perform the respective method 400, 500, 600, 700 and/or 800. The computer-readable media may be embodied as any type of media capable of being read by the computing device 100 including, but not limited to, the memory 130, the data storage device 132, firmware devices, other memory or data storage devices of the computing device 100, portable media readable by a peripheral device 140 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure device enumeration, the computing device comprising: a universal serial bus (USB) controller; one or more processors; and one or more memory devices having stored therein a plurality of instructions that, when executed by the one or more processors, cause the computing device to: send, by a trusted execution environment, a secure command to the USB controller to protect a device descriptor request for a first peripheral device connected to the USB controller; and send the device descriptor request to the first peripheral device in response to sending of the secure command to the USB controller; wherein the USB controller is to redirect a device descriptor received from the first peripheral device to a secure memory buffer in response to the sending of the secure command to the USB controller and in response to sending of the device descriptor request, wherein the device descriptor comprises metadata indicative of the first peripheral device; and wherein the one or more memory devices have stored therein a plurality of instructions that, when executed by the one or more processors, further cause the computing device to (i) verify, by the trusted execution environment, the device descriptor in response to redirecting of the device descriptor and (ii) enable, by the trusted execution environment, the first peripheral device in response to verification of the device descriptor.

Example 2 includes the subject matter of Example 1, and further comprising: a static controller configuration device that is statically coupled to the USB controller; wherein to send the secure command to the USB controller comprises to send the secure command to the static controller configuration device via a secure I/O channel.

Example 3 includes the subject matter of any of Examples 1 and 2, and wherein to send the secure command to the USB controller comprises to: execute a first processor instruction to bind the secure command to the USB controller; and execute a second processor instruction to unwrap the secure command and deliver the secure command to the USB controller via a secure fabric of the computing device.

Example 4 includes the subject matter of any of Examples 1-3, and wherein: the one or more memory devices have stored therein a plurality of instructions that, when executed by the one or more processors, further cause the computing device to determine, by the trusted execution environment, whether the first peripheral device is connected to the USB controller; and to send the secure command to the USB controller comprises to send the secure command to the USB controller in response to a determination that the first peripheral device is connected to the USB controller.

Example 5 includes the subject matter of any of Examples 1-4, and wherein to determine whether the first peripheral device is connected to the USB controller comprises to: send a second secure command to the USB controller to get a device slot map; and receive a device slot map register value from the USB controller in response to sending of the second secure command, wherein the device slot map register value comprises a bitmap indicative of whether a peripheral device is connected to each of a plurality of device slots of the USB controller.

Example 6 includes the subject matter of any of Examples 1-5, and wherein to determine whether the first peripheral device is connected to the USB controller further comprises to receive a slot status change map register value from the USB controller in response to the sending of the second secure command, wherein the slot status change map register comprises a bitmap indicative of whether a connected status of each of the plurality of device slots of the USB controller has changed.

Example 7 includes the subject matter of any of Examples 1-6, and wherein: the one or more memory devices have stored therein a plurality of instructions that, when executed by the one or more processors, further cause the computing device to send, by the trusted execution environment, a third secure command to the USB controller to get a device slot map in response to the verification of the device descriptor, wherein the third secure command has a reset bit set; and the USB controller is to clear a slot status change map register in response to sending of the third secure command.

Example 8 includes the subject matter of any of Examples 1-7, and wherein the one or more memory devices have stored therein a plurality of instructions that, when executed by the one or more processors, further cause the computing device to: determine, by the trusted execution environment, that the peripheral device is not connected to the USB controller based on the device slot map register value and the slot status change map register value, wherein the peripheral device is associated with a first device slot of the USB controller, the first device slot is disconnected, and the connected status of the fist device slot has changed; and disable, by the trusted execution environment, the peripheral device in response to a determination that the peripheral device is not connected to the USB controller.

Example 9 includes the subject matter of any of Examples 1-8, and wherein: the one or more memory devices have stored therein a plurality of instructions that, when executed by the one or more processors, further cause the computing device to: (i) send, by the trusted execution environment, a second secure command to the USB controller to lock a USB configuration state, and (ii) send, by the trusted execution environment, a third secure command to the USB controller to unlock the USB configuration state in response to the verification of the device descriptor; wherein to send the secure command to the USB controller to protect the device descriptor comprises to send the secure command in response to sending of the second secure command.

Example 10 includes the subject matter of any of Examples 1-9, and wherein to send the secure command comprises to send a request type indicative of the device descriptor request, a slot identifier indicative of a device slot associated with the peripheral device, and a memory address of the secure memory buffer.

Example 11 includes the subject matter of any of Examples 1-10, and wherein the USB controller is further to store the request type, the slot identifier, and the memory address in response to the sending of the secure command.

Example 12 includes the subject matter of any of Examples 1-11, and wherein to redirect the device descriptor comprises to: determine whether the device descriptor request matches the request type and the slot identifier in response to storage of the request type, the slot identifier, and the memory address; and replace a target address of the device descriptor request with the memory address of the secure memory buffer in response to a determination that the device descriptor request matches the request type and the slot identifier.

Example 13 includes the subject matter of any of Examples 1-12, and wherein to determine whether the device descriptor request matches the request type and the slot identifier comprises to monitor an internal control transfer ring of the USB controller.

Example 14 includes the subject matter of any of Examples 1-13, and wherein: the one or more memory devices have stored therein a plurality of instructions that, when executed by the one or more processors, further cause the computing device to generate, by the trusted execution environment, a random nonce; and to send the secure command further comprises to send the nonce.

Example 15 includes the subject matter of any of Examples 1-14, and wherein: to redirect the device descriptor further comprises to append the nonce to the device descriptor; and to verify the device descriptor comprises to verify the nonce.

Example 16 includes the subject matter of any of Examples 1-15, and wherein to send the device descriptor request to the first peripheral device comprises to: issue, by the trusted execution environment, a system call to send the device descriptor request; and send, by a kernel driver of the computing device, the device descriptor request to the first peripheral device in response to issuance of the system call.

Example 17 includes the subject matter of any of Examples 1-16, and wherein the secure memory buffer is included in a processor reserved memory region.

Example 18 includes the subject matter of any of Examples 1-17, and wherein to verify the device descriptor comprises to: execute a copy and encrypt processor instruction to generate an encrypted device descriptor and write the encrypted device descriptor to a target memory buffer; and decrypt, by the trusted execution environment, the encrypted device descriptor in response to execution of the copy and encrypt processor instruction.

Example 19 includes the subject matter of any of Examples 1-18, and wherein to enable the first peripheral device comprises to decode the device descriptor.

Example 20 includes the subject matter of any of Examples 1-19, and wherein the one or more processors comprises a processor with secure enclave support, wherein the trusted execution environment comprises a secure enclave established with the secure enclave support of the processor.

Example 21 includes a method for secure device enumeration, the method comprising: sending, by a trusted execution environment of a computing device, a secure command to a universal serial bus (USB) controller of the computing device to protect a device descriptor request for a first peripheral device connected to the USB controller; sending, by the computing device, the device descriptor request to the first peripheral device in response to sending the secure command to the USB controller; redirecting, by the USB controller, a device descriptor received from the first peripheral device to a secure memory buffer in response to sending the secure command to the USB controller and in response to sending the device descriptor request, wherein the device descriptor comprises metadata indicative of the first peripheral device; verifying, by the trusted execution environment, the device descriptor in response to redirecting the device descriptor; and enabling, by the trusted execution environment, the first peripheral device in response to verifying the device descriptor.

Example 22 includes the subject matter of Example 21, and wherein sending the secure command to the USB controller comprises sending the secure command to a static controller configuration device via a secure I/O channel, wherein the static controller configuration device is statically coupled to the USB controller.

Example 23 includes the subject matter of any of Examples 21 and 22, and wherein sending the secure command to the USB controller comprises: executing a first processor instruction to bind the secure command to the USB controller; and executing a second processor instruction to unwrap the secure command and deliver the secure command to the USB controller via a secure fabric of the computing device.

Example 24 includes the subject matter of any of Examples 21-23, and further comprising: determining, by the trusted execution environment, whether the first peripheral device is connected to the USB controller; wherein sending the secure command to the USB controller comprises sending the secure command to the USB controller in response to determining that the first peripheral device is connected to the USB controller.

Example 25 includes the subject matter of any of Examples 21-24, and wherein determining whether the first peripheral device is connected to the USB controller comprises: sending a second secure command to the USB controller to get a device slot map; and receiving a device slot map register value from the USB controller in response to sending the second secure command, wherein the device slot map register value comprises a bitmap indicative of whether a peripheral device is connected to each of a plurality of device slots of the USB controller.

Example 26 includes the subject matter of any of Examples 21-25, and wherein determining whether the first peripheral device is connected to the USB controller further comprises receiving a slot status change map register value from the USB controller in response to sending the second secure command, wherein the slot status change map register comprises a bitmap indicative of whether a connected status of each of the plurality of device slots of the USB controller has changed.

Example 27 includes the subject matter of any of Examples 21-26, and further comprising: sending, by the trusted execution environment, a third secure command to the USB controller to get a device slot map in response to verifying the device descriptor, wherein the third secure command has a reset bit set; and clearing, by the USB controller, a slot status change map register in response to sending the third secure command.

Example 28 includes the subject matter of any of Examples 21-27, and further comprising: determining, by the trusted execution environment, that the peripheral device is not connected to the USB controller based on the device slot map register value and the slot status change map register value, wherein the peripheral device is associated with a first device slot of the USB controller, the first device slot is disconnected, and the connected status of the fist device slot has changed; and disabling, by the trusted execution environment, the peripheral device in response to determining that the peripheral device is not connected to the USB controller.

Example 29 includes the subject matter of any of Examples 21-28, and further comprising: sending, by the trusted execution environment, a second secure command to the USB controller to lock a USB configuration state; and sending, by the trusted execution environment, a third secure command to the USB controller to unlock the USB configuration state in response to verifying the device descriptor; wherein sending the secure command to the USB controller to protect the device descriptor comprises sending the secure command in response to sending the second secure command.

Example 30 includes the subject matter of any of Examples 21-29, and wherein sending the secure command comprises sending a request type indicative of the device descriptor request, a slot identifier indicative of a device slot associated with the peripheral device, and a memory address of the secure memory buffer.

Example 31 includes the subject matter of any of Examples 21-30, and further comprising storing, by the USB controller, the request type, the slot identifier, and the memory address in response to sending the secure command.

Example 32 includes the subject matter of any of Examples 21-31, and wherein redirecting the device descriptor comprises: determining, by the USB controller, whether the device descriptor request matches the request type and the slot identifier in response to storing the request type, the slot identifier, and the memory address; and replacing, by the USB controller, a target address of the device descriptor request with the memory address of the secure memory buffer in response to determining that the device descriptor request matches the request type and the slot identifier.

Example 33 includes the subject matter of any of Examples 21-32, and wherein determining whether the device descriptor request matches the request type and the slot identifier comprises monitoring an internal control transfer ring of the USB controller.

Example 34 includes the subject matter of any of Examples 21-33, and further comprising: generating, by the trusted execution environment, a random nonce; wherein sending the secure command further comprises sending the nonce.

Example 35 includes the subject matter of any of Examples 21-34, and wherein: redirecting the device descriptor further comprises appending, by the USB controller, the nonce to the device descriptor; and verifying the device descriptor comprises verifying the nonce.

Example 36 includes the subject matter of any of Examples 21-35, and wherein sending the device descriptor request to the first peripheral device comprises: issuing, by the trusted execution environment, a system call to send the device descriptor request; and sending, by a kernel driver of the computing device, the device descriptor request to the first peripheral device in response to issuing the system call.

Example 37 includes the subject matter of any of Examples 21-36, and wherein the secure memory buffer is included in a processor reserved memory region.

Example 38 includes the subject matter of any of Examples 21-37, and wherein verifying the device descriptor comprises: executing a copy and encrypt processor instruction to generate an encrypted device descriptor and write the encrypted device descriptor to a target memory buffer; and decrypting, by the trusted execution environment, the encrypted device descriptor in response to executing the copy and encrypt processor instruction.

Example 39 includes the subject matter of any of Examples 21-38, and wherein enabling the first peripheral device comprises decoding, by the trusted execution environment, the device descriptor.

Example 40 includes the subject matter of any of Examples 21-39, and wherein the trusted execution environment comprises a secure enclave established with secure enclave support of a processor of the computing device.

Example 41 includes a computing device comprising: a processor; and a memory having stored therein a plurality of instructions that when executed by the processor cause the computing device to perform the method of any of Examples 21-40.

Example 42 includes one or more non-transitory, computer readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for secure device enumeration, the computing device comprising: means for sending, by a trusted execution environment of the computing device, a secure command to a universal serial bus (USB) controller of the computing device to protect a device descriptor request for a first peripheral device connected to the USB controller; means for sending the device descriptor request to the first peripheral device in response to sending the secure command to the USB controller; means for redirecting, by the USB controller, a device descriptor received from the first peripheral device to a secure memory buffer in response to sending the secure command to the USB controller and in response to sending the device descriptor request, wherein the device descriptor comprises metadata indicative of the first peripheral device; means for verifying, by the trusted execution environment, the device descriptor in response to redirecting the device descriptor; and means for enabling, by the trusted execution environment, the first peripheral device in response to verifying the device descriptor.

Example 45 includes the subject matter of Example 44, and wherein the means for sending the secure command to the USB controller comprises means for sending the secure command to a static controller configuration device via a secure I/O channel, wherein the static controller configuration device is statically coupled to the USB controller.

Example 46 includes the subject matter of any of Examples 44 and 45, and wherein the means for sending the secure command to the USB controller comprises: means for executing a first processor instruction to bind the secure command to the USB controller; and means for executing a second processor instruction to unwrap the secure command and deliver the secure command to the USB controller via a secure fabric of the computing device.

Example 47 includes the subject matter of any of Examples 44-46, and further comprising: means for determining, by the trusted execution environment, whether the first peripheral device is connected to the USB controller; wherein the means for sending the secure command to the USB controller comprises means for sending the secure command to the USB controller in response to determining that the first peripheral device is connected to the USB controller.

Example 48 includes the subject matter of any of Examples 44-47, and wherein the means for determining whether the first peripheral device is connected to the USB controller comprises: means for sending a second secure command to the USB controller to get a device slot map; and means for receiving a device slot map register value from the USB controller in response to sending the second secure command, wherein the device slot map register value comprises a bitmap indicative of whether a peripheral device is connected to each of a plurality of device slots of the USB controller.

Example 49 includes the subject matter of any of Examples 44-48, and wherein the means for determining whether the first peripheral device is connected to the USB controller further comprises means for receiving a slot status change map register value from the USB controller in response to sending the second secure command, wherein the slot status change map register comprises a bitmap indicative of whether a connected status of each of the plurality of device slots of the USB controller has changed.

Example 50 includes the subject matter of any of Examples 44-49, and further comprising: means for sending, by the trusted execution environment, a third secure command to the USB controller to get a device slot map in response to verifying the device descriptor, wherein the third secure command has a reset bit set; and means for clearing, by the USB controller, a slot status change map register in response to sending the third secure command.

Example 51 includes the subject matter of any of Examples 44-50, and further comprising: means for determining, by the trusted execution environment, that the peripheral device is not connected to the USB controller based on the device slot map register value and the slot status change map register value, wherein the peripheral device is associated with a first device slot of the USB controller, the first device slot is disconnected, and the connected status of the first device slot has changed; and means for disabling, by the trusted execution environment, the peripheral device in response to determining that the peripheral device is not connected to the USB controller.

Example 52 includes the subject matter of any of Examples 44-51, and further comprising: means for sending, by the trusted execution environment, a second secure command to the USB controller to lock a USB configuration state; and means for sending, by the trusted execution environment, a third secure command to the USB controller to unlock the USB configuration state in response to verifying the device descriptor; wherein the means for sending the secure command to the USB controller to protect the device descriptor comprises means for sending the secure command in response to sending the second secure command.

Example 53 includes the subject matter of any of Examples 44-52, and wherein the means for sending the secure command comprises means for sending a request type indicative of the device descriptor request, a slot identifier indicative of a device slot associated with the peripheral device, and a memory address of the secure memory buffer.

Example 54 includes the subject matter of any of Examples 44-53, and further comprising means for storing, by the USB controller, the request type, the slot identifier, and the memory address in response to sending the secure command.

Example 55 includes the subject matter of any of Examples 44-54, and wherein the means for redirecting the device descriptor comprises: means for determining, by the USB controller, whether the device descriptor request matches the request type and the slot identifier in response to storing the request type, the slot identifier, and the memory address; and means for replacing, by the USB controller, a target address of the device descriptor request with the memory address of the secure memory buffer in response to determining that the device descriptor request matches the request type and the slot identifier.

Example 56 includes the subject matter of any of Examples 44-55, and wherein the means for determining whether the device descriptor request matches the request type and the slot identifier comprises means for monitoring an internal control transfer ring of the USB controller.

Example 57 includes the subject matter of any of Examples 44-56, and further comprising: means for generating, by the trusted execution environment, a random nonce; wherein the means for sending the secure command further comprises means for sending the nonce.

Example 58 includes the subject matter of any of Examples 44-57, and wherein: the means for redirecting the device descriptor further comprises means for appending, by the USB controller, the nonce to the device descriptor; and the means for verifying the device descriptor comprises means for verifying the nonce.

Example 59 includes the subject matter of any of Examples 44-58, and wherein the means for sending the device descriptor request to the first peripheral device comprises: means for issuing, by the trusted execution environment, a system call to send the device descriptor request; and means for sending, by a kernel driver of the computing device, the device descriptor request to the first peripheral device in response to issuing the system call.

Example 60 includes the subject matter of any of Examples 44-59, and wherein the secure memory buffer is included in a processor reserved memory region.

Example 61 includes the subject matter of any of Examples 44-60, and wherein the means for verifying the device descriptor comprises: means for executing a copy and encrypt processor instruction to generate an encrypted device descriptor and write the encrypted device descriptor to a target memory buffer; and means for decrypting, by the trusted execution environment, the encrypted device descriptor in response to executing the copy and encrypt processor instruction.

Example 62 includes the subject matter of any of Examples 44-61, and wherein the means for enabling the first peripheral device comprises means for decoding, by the trusted execution environment, the device descriptor.

Example 63 includes the subject matter of any of Examples 44-62, and wherein the trusted execution environment comprises a secure enclave established with secure enclave support of a processor of the computing device.

Example 64 includes a computing device for secure device enumeration, the computing device comprising: a universal serial bus (USB) controller; and a trusted execution environment to send a secure command to the USB controller to protect a device descriptor request for a first peripheral device connected to the USB controller; and an I/O stack to send the device descriptor request to the first peripheral device in response to sending of the secure command to the USB controller; wherein the USB controller is to redirect a device descriptor received from the first peripheral device to a secure memory buffer in response to the sending of the secure command to the USB controller and in response to sending of the device descriptor request, wherein the device descriptor comprises metadata indicative of the first peripheral device; and wherein the trusted execution environment is to (i) verify the device descriptor in response to redirecting of the device descriptor and (ii) enable the first peripheral device in response to verification of the device descriptor.

Example 65 includes the subject matter of Example 64, and further comprising: a static controller configuration device that is statically coupled to the USB controller; wherein to send the secure command to the USB controller comprises to send the secure command to the static controller configuration device via a secure I/O channel.

Example 66 includes the subject matter of any of Examples 64 and 65, and wherein to send the secure command to the USB controller comprises to: execute a first processor instruction to bind the secure command to the USB controller; and execute a second processor instruction to unwrap the secure command and deliver the secure command to the USB controller via a secure fabric of the computing device.

Example 67 includes the subject matter of any of Examples 64-66, and wherein: the trusted execution environment is further to determine whether the first peripheral device is connected to the USB controller; and to send the secure command to the USB controller comprises to send the secure command to the USB controller in response to a determination that the first peripheral device is connected to the USB controller.

Example 68 includes the subject matter of any of Examples 64-67, and wherein to determine whether the first peripheral device is connected to the USB controller comprises to: send a second secure command to the USB controller to get a device slot map; and receive a device slot map register value from the USB controller in response to sending of the second secure command, wherein the device slot map register value comprises a bitmap indicative of whether a peripheral device is connected to each of a plurality of device slots of the USB controller.

Example 69 includes the subject matter of any of Examples 64-68, and wherein to determine whether the first peripheral device is connected to the USB controller further comprises to receive a slot status change map register value from the USB controller in response to the sending of the second secure command, wherein the slot status change map register comprises a bitmap indicative of whether a connected status of each of the plurality of device slots of the USB controller has changed.

Example 70 includes the subject matter of any of Examples 64-69, and wherein: the trusted execution environment is further to send a third secure command to the USB controller to get a device slot map in response to the verification of the device descriptor, wherein the third secure command has a reset bit set; and the USB controller is to clear a slot status change map register in response to sending of the third secure command.

Example 71 includes the subject matter of any of Examples 64-70, and wherein the trusted execution environment is further to: determine that the peripheral device is not connected to the USB controller based on the device slot map register value and the slot status change map register value, wherein the peripheral device is associated with a first device slot of the USB controller, the first device slot is disconnected, and the connected status of the fist device slot has changed; and disable the peripheral device in response to a determination that the peripheral device is not connected to the USB controller.

Example 72 includes the subject matter of any of Examples 64-71, and wherein: the trusted execution environment is further to (i) send a second secure command to the USB controller to lock a USB configuration state, and (ii) send a third secure command to the USB controller to unlock the USB configuration state in response to the verification of the device descriptor; wherein to send the secure command to the USB controller to protect the device descriptor comprises to send the secure command in response to sending of the second secure command.

Example 73 includes the subject matter of any of Examples 64-72, and wherein to send the secure command comprises to send a request type indicative of the device descriptor request, a slot identifier indicative of a device slot associated with the peripheral device, and a memory address of the secure memory buffer.

Example 74 includes the subject matter of any of Examples 64-73, and wherein the USB controller is further to store the request type, the slot identifier, and the memory address in response to the sending of the secure command.

Example 75 includes the subject matter of any of Examples 64-74, and wherein to redirect the device descriptor comprises to: determine whether the device descriptor request matches the request type and the slot identifier in response to storage of the request type, the slot identifier, and the memory address; and replace a target address of the device descriptor request with the memory address of the secure memory buffer in response to a determination that the device descriptor request matches the request type and the slot identifier.

Example 76 includes the subject matter of any of Examples 64-75, and wherein to determine whether the device descriptor request matches the request type and the slot identifier comprises to monitor an internal control transfer ring of the USB controller.

Example 77 includes the subject matter of any of Examples 64-76, and wherein: the trusted execution environment is further to generate, a random nonce; and to send the secure command further comprises to send the nonce.

Example 78 includes the subject matter of any of Examples 64-77, and wherein: to redirect the device descriptor further comprises to append the nonce to the device descriptor; and to verify the device descriptor comprises to verify the nonce.

Example 79 includes the subject matter of any of Examples 64-78, and wherein the I/O stack comprises a kernel driver, and wherein to send the device descriptor request to the first peripheral device comprises to: issue, by the trusted execution environment, a system call to send the device descriptor request; and send, by the kernel driver, the device descriptor request to the first peripheral device in response to issuance of the system call.

Example 80 includes the subject matter of any of Examples 64-79, and wherein the secure memory buffer is included in a processor reserved memory region.

Example 81 includes the subject matter of any of Examples 64-80, and wherein to verify the device descriptor comprises to: execute a copy and encrypt processor instruction to generate an encrypted device descriptor and write the encrypted device descriptor to a target memory buffer; and decrypt, by the trusted execution environment, the encrypted device descriptor in response to execution of the copy and encrypt processor instruction.

Example 82 includes the subject matter of any of Examples 64-81, and wherein to enable the first peripheral device comprises to decode the device descriptor.

Example 83 includes the subject matter of any of Examples 64-82, and further comprising a processor with secure enclave support, wherein the trusted execution environment comprises a secure enclave established with the secure enclave support of the processor.

The invention claimed is:

1. A universal serial bus (USB) controller for secure device enumeration, the USB controller comprising:

a device slot map register that comprises a bitmap indicative of whether a peripheral device is connected to each of a plurality of device slots of the USB controller;

wherein the USB controller is to:

receive a first secure command to query the device slot map register from a trusted execution environment;

send a device slot map register value indicative of the device slot map register to the trusted execution environment in response to receipt of the first secure command;

receive a second secure command to protect a device descriptor request for a first peripheral device connected to the USB controller from the trusted execution environment; and redirect a device descriptor received from the first peripheral device to a secure memory buffer in response to receipt of the second secure command, wherein the device descriptor comprises metadata indicative of the first peripheral device.

2. The USB controller of claim 1, further comprising:

a slot status change map register that comprises a bitmap indicative of whether a connected status of each of the plurality of device slots of the USB controller has changed;

wherein the USB controller is further to send a slot status change map register value indicative of the slot status change map register to the trusted execution environment in response to the receipt of the first secure command.

3. The USB controller of claim 2, wherein the USB controller is further to:

receive a third secure command to get a device slot map from the trusted execution environment, wherein the third secure command has a reset bit set; and clear the slot status change map register in response to receipt of the third secure command.

4. The USB controller of claim 1, wherein the USB controller is further to:

receive a third secure command to lock a USB configuration state from the trusted execution environment; and lock the USB configuration state in response to receipt of the third secure command;

wherein to receive the second secure command comprises to receive the second secure command in response to locking of the USB configuration state.

5. The USB controller of claim 1, wherein the second secure command comprises a request type indicative of the device descriptor request, a slot identifier indicative of a device slot associated with the first peripheral device, and a memory address of the secure memory buffer.

6. The USB controller of claim 5, wherein the USB controller is further to store the request type, the slot identifier, and the memory address in response to the receipt of the second secure command.

7. The USB controller of claim 6, wherein to redirect the device descriptor comprises to:

determine whether the device descriptor request matches the request type and the slot identifier in response to storage of the request type, the slot identifier, and the memory address; and replace a target address of the device descriptor request with the memory address of the secure memory buffer in response to a determination that the device descriptor request matches the request type and the slot identifier.

8. The USB controller of claim 7, further comprising an internal control transfer ring, wherein to determine whether the device descriptor request matches the request type and the slot identifier comprises to monitor the internal control transfer ring.

9. The USB controller of claim 1, wherein the USB controller is further to:

submit a request to get device descriptor to the first peripheral device in response to receipt of the second secure command; and receive the device descriptor from the first peripheral device in response to submission of the request to get device descriptor;

wherein to redirect the device descriptor comprises to redirect the device descriptor in response to receipt of the device descriptor from the first peripheral device.

10. The USB controller of claim 1, further comprising a static controller configuration device, wherein:

to receive the first secure command comprises to receive the first secure command by the static controller configuration device via a secure I/O channel; and to receive the second secure command comprises to receive the second secure command by the static controller configuration device via the secure I/O channel.

11. The USB controller of claim 1, wherein:

to receive the first secure command comprises to receive the first secure command via a secure fabric coupled to the USB controller; and to receive the second secure command comprises to receive the second secure command via a secure fabric coupled to the USB controller.

12. A method for secure device enumeration, the method comprising:

receiving, by a universal serial bus (USB) controller, a first secure command to query a device slot map register from a trusted execution environment, wherein the device slot map register comprises a bitmap indicative of whether a peripheral device is connected to each of a plurality of device slots of the USB controller;

sending, by the USB controller, a device slot map register value indicative of the device slot map register to the trusted execution environment in response to receiving the first secure command;

receiving, by the USB controller, a second secure command to protect a device descriptor request for a first peripheral device connected to the USB controller from the trusted execution environment; and redirecting, by the USB controller, a device descriptor received from the first peripheral device to a secure memory buffer in response to receiving the second secure command, wherein the device descriptor comprises metadata indicative of the first peripheral device.

13. The method of claim 12, wherein receiving the second secure command comprises receiving a request type indicative of the device descriptor request, a slot identifier indicative of a device slot associated with the first peripheral device, and a memory address of the secure memory buffer.

14. The method of claim 13, further comprising storing, by the USB controller, the request type, the slot identifier, and the memory address in response to receiving the second secure command.

15. The method of claim 12, further comprising:

submitting, by the USB controller, a request to get device descriptor to the first peripheral device in response to receiving the second secure command; and receiving, by the USB controller, the device descriptor from the first peripheral device in response to submitting the request to get device descriptor;

wherein redirecting the device descriptor comprises redirecting the device descriptor in response receiving the device descriptor from the first peripheral device.

16. One or more non-transitory computer-readable storage media comprising a plurality of instructions stored thereon that, in response to being executed, cause a universal serial bus (USB) controller to:

receive a first secure command to query a device slot map register from a trusted execution environment, wherein the device slot map register comprises a bitmap indicative of whether a peripheral device is connected to each of a plurality of device slots of the USB controller;

send a device slot map register value indicative of the device slot map register to the trusted execution environment in response to receiving the first secure command;

receive a second secure command to protect a device descriptor request for a first peripheral device connected to the USB controller from the trusted execution environment; and redirect a device descriptor received from the first peripheral device to a secure memory buffer in response to receiving the second secure command, wherein the device descriptor comprises metadata indicative of the first peripheral device.

17. The one or more non-transitory computer-readable storage media of claim 16, wherein to receive the second secure command comprises to receive a request type indicative of the device descriptor request, a slot identifier indicative of a device slot associated with the first peripheral device, and a memory address of the secure memory buffer.

18. The one or more non-transitory computer-readable storage media of claim 17, further comprising a plurality of instructions stored thereon that, in response to being executed, cause the USB controller to store the request type, the slot identifier, and the memory address in response to receiving the second secure command.

19. The one or more non-transitory computer-readable storage media of claim 18, wherein to redirect the device descriptor comprises to:

determine whether the device descriptor request matches the request type and the slot identifier in response to storing the request type, the slot identifier, and the memory address; and replace a target address of the device descriptor request with the memory address of the secure memory buffer in response to determining that the device descriptor request matches the request type and the slot identifier.

20. The one or more non-transitory computer-readable storage media of claim 16, further comprising a plurality of instructions stored thereon that, in response to being executed, cause the USB controller to:

submit a request to get device descriptor to the first peripheral device in response to receiving the second secure command; and receive the device descriptor from the first peripheral device in response to submitting the request to get device descriptor;

wherein to redirect the device descriptor comprises to redirect the device descriptor in response receiving the device descriptor from the first peripheral device.

* * * * *